June 17, 1958     W. C. SCHWALGE     2,839,196
OIL RECLAIMER

Filed Aug. 9, 1955     2 Sheets-Sheet 1

INVENTOR.
William C. Schwalge,
BY
Schroeder, Hofgren, Brady & Wegner
Atty's.

June 17, 1958 W. C. SCHWALGE 2,839,196
OIL RECLAIMER
Filed Aug. 9, 1955 2 Sheets-Sheet 2

INVENTOR.
William C. Schwalge,
BY Schroeder, Hofgren,
Brady & Wegner Attys.

United States Patent Office 2,839,196
Patented June 17, 1958

2,839,196

OIL RECLAIMER

William C. Schwalge, Prairie View, Ill.

Application August 9, 1955, Serial No. 527,286

9 Claims. (Cl. 210—180)

This invention relates to an oil reclaiming device; and in particular it relates to an oil reclaiming device which is adapted for installation in modern motor vehicles.

It has been well known for many years that the conventional oil filters used in internal combustion engines are of only limited value because they provide no means of removing light diluents or water from the oil. This requires some sort of a vaporizing unit in addition to the filter.

The principal object of the present invention is to provide an oil reclaiming device which is adapted for installation in modern passenger vehicles in which the exhaust manifold is so positioned that it can not be reached as a source of heat for operating the vaporizing mechanism of the reclaimer.

A further object of the invention is to provide an oil reclaiming device in which the oil is first passed through a filter and then enters a separate vaporizing chamber through a structure which releases oil into a group of elevated oil bearing channels close to a heating unit, from which channels the oil may flow by gravity over inclined heated vaporizing surfaces. In the preferred embodiment of the invention a plate which overlies the filter compartment is provided with upstanding arcuate bosses which have concave tops providing the oil bearing channels, and the oil passes upwardly through bores in the bosses to the channels. The bosses have inclined side walls so that oil overflow from the channels flows down over the inclined surfaces.

A yet further object of the invention is to provide an oil reclaimer which has an easily removable heating unit mounted in the closure for the oil reclaimer body.

The invention is illustrated in a preferred embodiment in the accompanying drawings in which.

Figure 1:
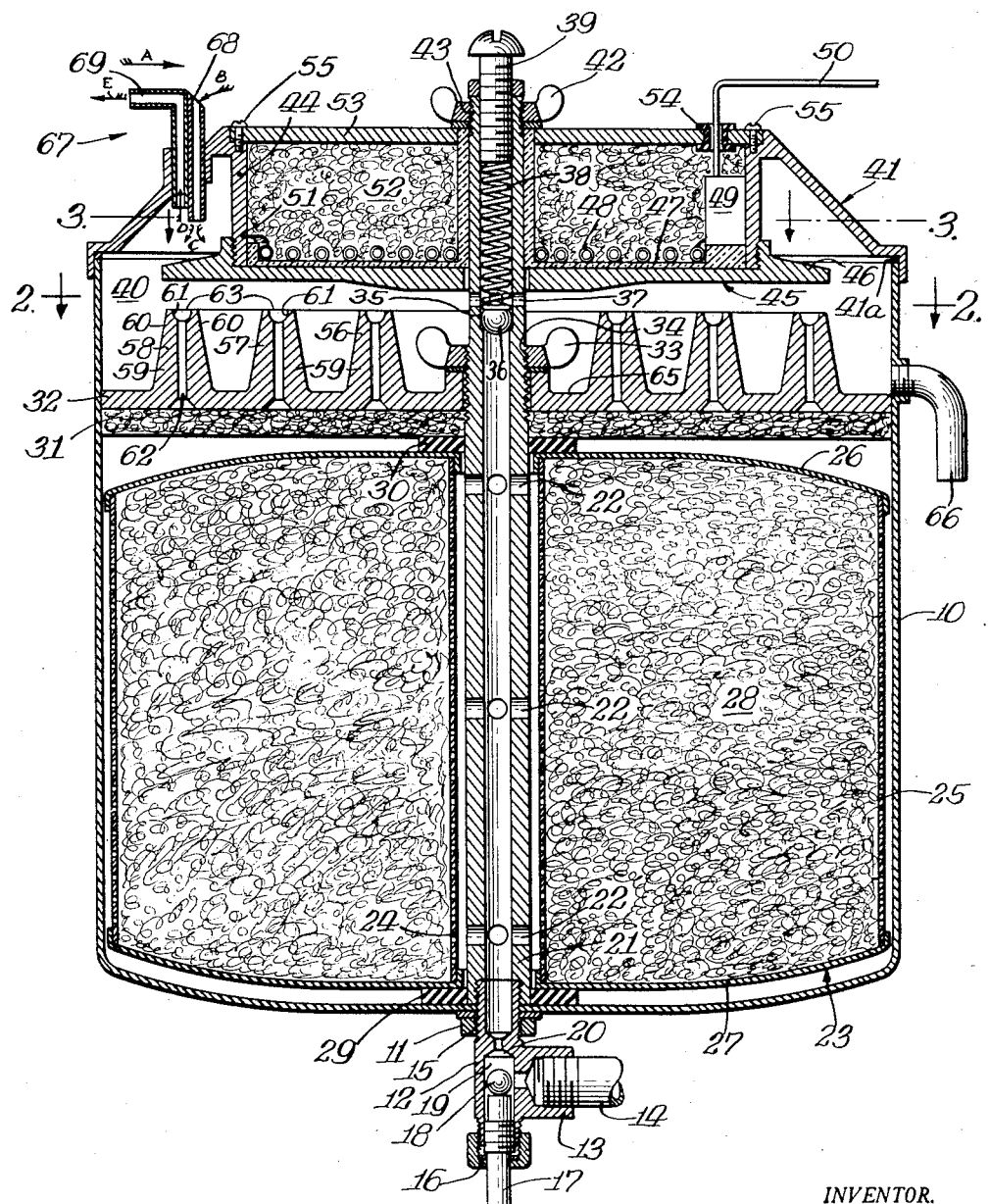
Fig. 1 is a central vertical sectional view of the preferred embodiment of the invention.

Referring to the drawings in greater detail, and referring first to Fig. 1, the oil reclaimer of the present invention includes a cylindrical hollow body 10 which is preferably cast from metal of suitable characteristics. At the bottom of the hollow body 10 is a boss 11 which is threaded to receive an inlet fitting 12. The inlet fitting may conveniently be a metal block having a hollow boss 13 to receive an inlet pipe 14, an externally threaded connecting portion 15 by means of which it is screwed into the boss 11, and a cutoff valve assembly 16 which includes a rotatable threaded shaft 17 and a ball 18 which is carried in a cavity 19 in the body of the inlet fitting 12. The screw 17 and ball 18 may be used to cut off the flow of oil into the hollow body 10 by screwing the ball up against the valve seat 20; and when the ball is in the position shown in Fig. 1 the flow of oil around it moves it about in the inlet fitting so as to prevent sludge or other heavy material from building up around the passage into the hollow body 10.

As is customarily the case with oil reclaimers for motor vehicles, the device of the present invention operates both as an oil filter and as a vaporizer to remove water and hydrocarbon diluents from the oil, and for this purpose has a central inlet tube 21 which has a number of sets of oil passages 22 along its length so that oil entering the tube 21 may flow outwardly through the passages 22 into a filter cartridge member, indicated generally by the numeral 23. The filter cartridge member is of a known type which includes a central foraminous sleeve 24 surrounding the oil delivery tube 21, a perforate outside wall 25 and top and bottom plates 26 and 27, respectively, which cooperate to form a generally annular body which is packed with filter material 28. Preferably the filter cartridge 23 is seated on a resilient washer 29 and is surmounted by a similar washer 30 so that oil passing outwardly through the passages 22 must pass through the filter cartridge 23.

Overlying the upper washer 30 is a dense filter pad 31 of felt or the like upon which is positioned a transverse filter plate 32, and the pad 31 and filter plate 32 are firmly pressed against the top of the filter cartridge 23 by means of a wing nut 33 engaging an assembly thread 34 on the upper portion of the oil delivery pipe 21.

Because of the fact that excessive use of the filter cartridge 23 and filter pad 31 without replacement may develop dangerous pressures within the hollow body 10, the oil inlet pipe 21 is preferably provided at its upper end portion with a counterbore 35 in the lower end of which is seated a safety valve ball 36, and above the ball 36 are pressure relief openings 37. The valve ball 36 is held down by an adjustable compression spring 38 the thrust of which on the ball may be adjusted by means of a set screw 39.

The portion of the hollow body 10 above the filter plate 32 forms a vaporizing chamber 40, and the vaporizing chamber 40 is covered by a removable closure member, indicated generally at 41, which seats on a gasket 41a and is clamped down by a wing nut 42 engaging an external thread 43 on the projecting upper end of the oil inlet pipe 21. The closure 41 is annular in form and has a depending internal integral ring 44 which serves as the side wall for a heating unit assembly, indicated generally at 45. The heating unit assembly includes a cast aluminum bottom plate 46 which screws onto the lower end of the depending side wall 44, a thin dielectric base 47 of mica or the like on top of the plate 46, and an electric heating coil 48 which is supported on the base 47. One end of the heating coil 48 is wired through a thermostat, indicated diagrammatically at 49, from which an electric lead 50 goes to the automobile electric system, while the other end of the heating coil 48 is grounded on the metal side wall 44 of the cover member at 51. Preferably the space above the coil 48 is packed with insulating material 52 such as rock wool, asbestos or the like. The electric heating unit is completed by a removable cover plate 53 having an aperture provided with a rubber grommet 54 through which the wire 50 passes. The removable cover plate 53 is held in place by screws 55.

Figure 2:
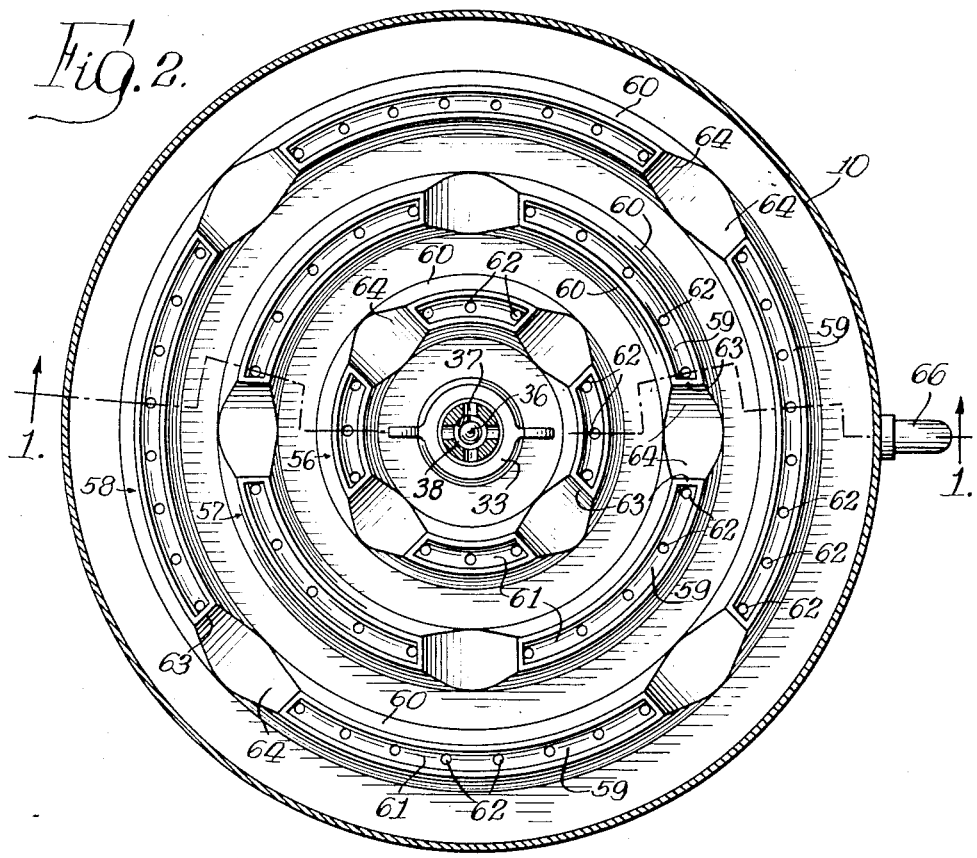
Fig. 2 is a section taken as indicated along the line 2—2 of Fig. 1.
Figure 3:
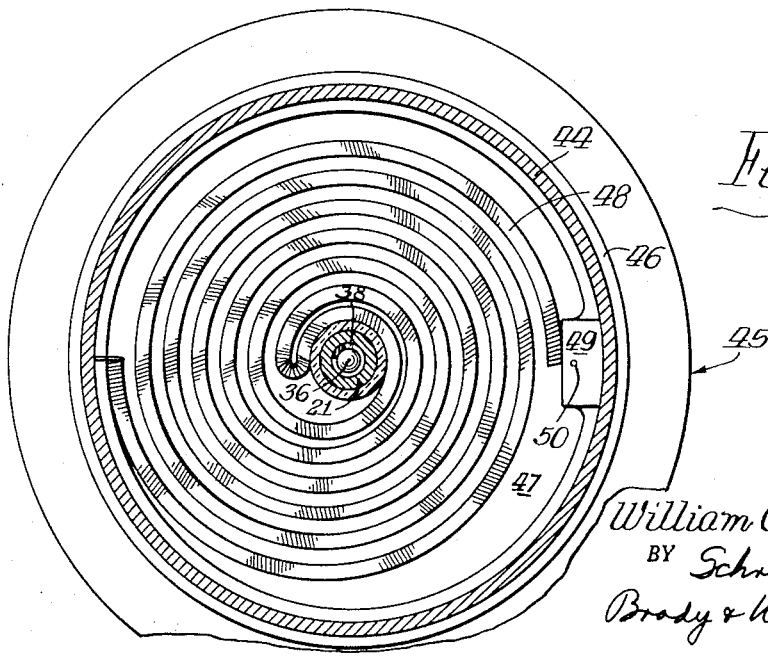
Fig. 3 is a section taken as indicated along the line 3—3 of Fig. 1.

Referring now to the filter plate 32, and referring particularly to Figs. 1 and 2, we find that the filter plate is provided with three concentric rings 56, 57 and 58 of upstanding bosses 59. Each of the bosses is in the form of an arc of a circle having its center on the axis of the oil inlet pipe 21, and the bosses have sharply sloping side walls 60, concave tops forming oil channels 61, and circumferentially spaced oil inlet holes or tubes 62 which extend through the bosses from bottom to top. As best seen in Fig. 2, the concave oil bearing channels 61 have end walls 63 which are flush with the upper side margins of the channels so that oil may flow upwardly through the tubes 62 to fill the channels 61, and overflow the channels down the inclined side walls 60 of the bosses and also down inclined end walls 64 of the bosses onto the top surface 65 of the filter plate 32. The oil may then flow along the top surface 65 and out through an oil return line 66.

In operation oil enters the hollow body 10 through the oil inlet pipe 21, flows out through the oil passages 22 and through the mass of filter material 28 in the filter cartridge 23, thence upwardly around the filter cartridge, through the felt filter pad 31 and upwardly through the tubes 62 in the bosses 59 of the three rings of bosses 56, 57 and 58. The electric heating coil 48 heats the entire surface area of the aluminum bottom plate 46 of the heating unit, and heat radiated from said bottom plate heats the oil in the elevated channels 61, and particularly heats the oil which overflows the channels 61 as it passes in a thin film along the inclined sides 60 and ends 64 of the bosses. Heating of the oil in the above fashion, particularly the relatively high degree of heat as the oil flows in a thin film down the inclined faces 60 and 64 of the bosses, serves to vaporize from the oil any water or light hydrocarbon diluents in the oil, a vent unit 67 is provided to remove vaporized material from the vaporizing chamber 40; and as seen in Fig. 1, the vent unit 67 preferably includes an inlet pipe 68 which has an inclined outer end, and an outlet pipe 69 which faces rearwardly with respect to the direction of travel of the vehicle. A screen may be provided over the inlet pipe 68 if desired.

In Fig. 1, arrow A shows the direction of motion of the vehicle on which the oil reclaimer is mounted; arrow B shows the flow of air into pipe 68; arrow C the spreading flow of air into the vaporizing chamber 40 from pipe 68; and arrows D and E the flow of air out of the chamber through pipe 69.

The foregoing detailed description is given for clearness of understanding only and no unnecessary limitations are to be understood therefrom, as some modifications will be obvious to those skilled in the art.

I claim:

1. In an oil reclaimer: a vaporizing chamber having a floor and a removable closure; a plurality of elongated, elevated oil conducting channels in said chamber above and substantially parallel to said floor; separate inclined vaporizing surfaces extending downwardly from each of said channels toward said floor so that oil overflowing from the channels passes over said vaporizing surfaces; means for admitting oil to said channels for flow over said vaporizing surfaces; heating means in said chamber for heating the oil in said channels and flowing over said surfaces to vaporize impurities therefrom; an oil outlet to receive oil from said vaporizing surface; and vent means to permit vaporized impurities to escape from the chamber.

2. In an oil reclaimer: a vaporizing chamber having a floor and a removable closure; a plurality of elongated, elevated oil conducting channels in said chamber above and substantially parallel to said floor there being a plurality of passages extending upwardly through the floor to admit oil to said channels; separate inclined vaporizing surfaces extending downwardly from each of said channels toward said floor so that oil overflowing from the channels passes over said vaporizing surfaces; heating means in said chamber for heating the oil in said channels and flowing over said surfaces to vaporize impurities therefrom; an oil outlet to receive oil from said vaporizing surface; and vent means to permit vaporized impurities to escape from the chamber.

3. In an oil reclaimer: a vaporizing chamber having a floor and a removable closure; a plurality of elongated, elevated oil conducting channels in said chamber above and substantially parallel to said floor; separate inclined vaporizing surfaces extending downwardly from each of said channels toward the floor so that oil overflowing from the channels passes over said vaporizing surfaces; means for admitting oil to said channels; heating means positioned in said chamber immediately above said channels to heat oil in said channels and on said vaporizing surfaces and vaporize impurities therefrom; an oil outlet to receive oil from said vaporizing surface; and vent means to permit vaporized impurities to escape from the chamber.

4. In an oil reclaimer: a vaporizing chamber which has a floor provided with a plurality of upright bosses having concave top faces to serve as oil channels, and passages through the bosses to conduct oil from the underside of the floor to said channels, said bosses having inclined surfaces over which oil overflowing the channels may pass in a thin film; a removable closure for said chamber; means for vaporizing impurities from oil passing over said surfaces; an oil outlet to receive oil from said vaporizing surfaces; and vent means to permit vaporized impurities to escape from the chamber.

5. The device of claim 4 in which there are several concentric rings of bosses, and each boss is an arc of a circle, there being a space between the ends of circumferentially adjacent bosses, and there is a single oil outlet in a side wall of the vaporizing chamber at floor level.

6. The device of claim 5 in which the means for vaporizing oil consists of an electric heating element and a heat conductive plate spaced slightly above said bosses, the perimeter of said plate being substantially of the same diameter as the outer ring of bosses.

7. The device of claim 6 in which the heating element is supported on the closure for the chamber.

8. In an oil reclaimer: a hollow body member; a removable transverse plate dividing said body member into a lower oil receiving chamber and an upper vaporizing chamber, said plate being provided with a plurality of concentric rings of upright bosses each of which is an arc of a circle, there being a space between the ends of circumferentially adjacent bosses, said bosses having concave top faces to serve as oil channels and passages through the bosses to conduct oil from said lower chamber to said channels, and said bosses having inclined surfaces over which oil overflowing the channels may pass in a thin film; a removable closure surmounting said body member; and a removable electric heating unit mounted on said closure in the vaporizing chamber, said heating unit having a heat conducting bottom plate which is substantialy the same diameter as the outermost ring of bosses.

9. The device of claim 3 in which the heating means includes an electric resistance element mounted on the underside of the closure means and extending horizontally above a substantial proportion of the area occupied by said elongated elevated channels, and a heat conductive member in direct contact with all of said resistance element, said heat conductive member extending horizontally above substantially the entire area occupied by said channels.

References Cited in the file of this patent

UNITED STATES PATENTS

| 2,289,553 | Root | July 14, 1942 |
| 2,346,042 | Morris | Apr. 4, 1944 |
| 2,377,988 | Braun | June 12, 1945 |
| 2,428,939 | Morris | Oct. 14, 1947 |
| 2,635,759 | Schwalge | Apr. 21, 1953 |

FOREIGN PATENTS

| 469,087 | Great Britain | July 19, 1937 |